(12) United States Patent
Huang

(10) Patent No.: US 9,509,488 B1
(45) Date of Patent: Nov. 29, 2016

(54) RECEIVING CIRCUIT WITH ULTRA-WIDE COMMON-MODE INPUT VOLTAGE RANGE

(71) Applicant: AMAZING MICROELECTRONIC CORP., New Taipei (TW)

(72) Inventor: Hsun-Hsiu Huang, Hsinchu County (TW)

(73) Assignee: Amazing Microelectronic Corp., New Taipei (TW)

( * ) Notice: Subject to any disclaimer, the term of this patent is extended or adjusted under 35 U.S.C. 154(b) by 0 days.

(21) Appl. No.: 15/063,715

(22) Filed: Mar. 8, 2016

(30) Foreign Application Priority Data

Oct. 2, 2015 (TW) .............................. 104132481 A

(51) Int. Cl.
| H04B 3/02 | (2006.01) |
| H03K 19/0175 | (2006.01) |
| H04L 7/00 | (2006.01) |
| H04Q 1/54 | (2006.01) |

(52) U.S. Cl.
CPC .............. *H04L 7/0087* (2013.01); *H04Q 1/54* (2013.01); *H04Q 2213/401* (2013.01)

(58) Field of Classification Search
CPC ........... H04B 3/00; H04B 3/02; H04L 25/00; H04L 25/026; H04L 25/06; H03K 19/00; H03K 19/0175

USPC .............. 455/130, 296, 297, 343.1; 375/316, 375/317, 318
See application file for complete search history.

(56) References Cited

U.S. PATENT DOCUMENTS

| 5,539,778 A | * | 7/1996 | Kienzler | ............... H04L 25/063 327/389 |
| 7,274,916 B2 | | 9/2007 | Al-Shyoukh et al. | |
| 7,567,105 B2 | | 7/2009 | Trichy et al. | |
| 7,738,566 B2 | | 6/2010 | Berckmans et al. | |
| 8,324,935 B2 | | 12/2012 | Boezen | |

* cited by examiner

*Primary Examiner* — Blane Jackson
(74) *Attorney, Agent, or Firm* — Rosenberg, Klein & Lee

(57) ABSTRACT

A receiving circuit with an ultra-wide common-mode input voltage range applies to a controller area network (CAN) and comprises a resistor assembly electrically connected with a CANH and a CANL, a reference amplifier, a first input amplifier assembly, a second input amplifier assembly, and an analog adder. The receiving circuit receives voltages from the CANH and CANL. The resistor assembly bucks voltage, respectively generating CANH and CANL voltage divisions at first and second nodes and outputting the voltage divisions to the first and second input amplifier assemblies. The first and second input amplifier assemblies amplify the differential signal between the first and second nodes and convert the differential signal into single-end signals. The analog adder adds the single-end signals as the output signal. The receiving circuit can receive the signal ranging between the maximum and minimum common-mode voltages and reduce electromagnetic emission.

15 Claims, 3 Drawing Sheets

RECEIVING CIRCUIT WITH ULTRA-WIDE COMMON-MODE INPUT VOLTAGE RANGE

This application claims priority for Taiwan patent application no. 104132481 filed on Oct. 2, 2015, the content of which is incorporated in its entirely.

BACKGROUND OF THE INVENTION

Field of the Invention

The present invention relates to a receiving circuit of a controller area network, particularly to a receiving circuit with an ultra-wide common-mode input voltage range, which can receive a signal ranging between a maximum common-mode voltage and a minimum common-mode voltage.

Description of the Related Art

The controller area network (CAN) issued by International Standard Organization (ISO) (ISO-11898) is a communication system developed for European automobiles to transmit information in very harsh environments, integrating several in-vehicle controllers or computers to a network for sharing responsibilities and information, whereby to execute the demanded functions. The CAN bus is able to transmit information stably in harsh or instable electrical environments and usually applied to the control systems of various types of vehicles. The CAN bus adopts the two-wire differential technology and uses differential signals to transmit information. The common-mode signals on the two wires are maintained at a DC voltage, whereby only a very small amount of electromagnetic waves is emitted from the transmission lines, and whereby the CAN bus can transmit signals persistently while external common-mode signals interferes with the differential bus.

In a vehicular environment, great ground voltage shift exists between the ground terminals of different communication nodes. The maximum level of the ground shift voltage will be further increased by batteries with higher output voltage be applied in future vehicles. For example, the output voltage level of the batteries applied in traditional gasoline vehicles is 12V. However, the output voltage level of the batteries applied in modern electric vehicle has been increased to 48V for longer battery life currently. Therefore, the common-mode input voltage range of the CAN transceiver integration circuit must be improved continuously so as to normally receive information in the case that great ground voltage shift exists between the ground terminals of different communication nodes. Besides, in order to avoid electromagnetic emission (EME) from the communication network to interfere other functions of the vehicle, the common-mode signal of the CAN bus must be maintained at a fixed DC voltage and avoid any unnecessary high-frequency fluctuation on the common-mode signals during the circuit operation.

There have been many conventional technologies applied to the differential receiving circuit of the CAN transceiver. For an example, a U.S. Pat. No. 7,274,916B2 disclosed a differential receiving circuit and a method thereof. The conventional differential receiving circuit comprises a first voltage-current converter converting a voltage signal at a first input to a first current, a second voltage-current converter converting a voltage signal at a second input to a second current, and a current subtractor providing a differential current of the first current and the second current. For another example, a U.S. Pat. No. 7,567,105B2 disclosed a high-speed CAN receiving circuit with improved anti-electromagnetic interference ability, wherein the receiving circuit is connected with a resistor assembly among the power supply end, the ground end, the CAN high end and the CAN low end to attenuate the signals on the CAN bus. Next, the resistor assembly-attenuated signals are input to a front-end amplifier to amplify the reciprocal of the attenuation ratio of the resistor assembly. Thus, the intensity of the differential signal at the front-end amplifier output end is equal to the intensity of the differential signal on the CAN bus. The common-mode voltage at the front-end amplifier output end is attenuated to a range handleable by the comparator. Further, the front-end amplifier also outputs a common-mode voltage to a basic voltage generator for generating a reference voltage level to the comparator. Then, the comparator compares the signal output by the front-end amplifier and the reference voltage to determine the logics level of the received signal. For a further example, a U.S. Pat. No. 7,738,566B2 disclosed a circuit device for data transmission systems and an operating method thereof, wherein a resistor assembly is connected with the power supply end, the ground end, the CAN high end and the CAN low end to divide the voltages of the signals on the CAN bus and attenuate the common-mode signals to the range handleable by the rear-stage front-end amplifier, and wherein the output of the resistor assembly is electrically connected with a sets of front-end amplifiers which accepts the common-mode input voltage being limited by the power supply, whereby the range of the acceptable common-mode input voltage of the receiving circuit is increased.

All the abovementioned conventional technologies are used to improve the common-mode input voltage range of the receiving circuit of the CAN bus. However, each of them still has limitation in the input common-mode voltage range, not necessarily meet to the requirement of current CAN bus operation environment. For examples, in the U.S. Pat. No. 7,274,916, the highest common-mode input voltage is limited by the highest current driving capability of the transistors M0 and M3, ands the lowest common-mode input voltage is limited by the values of the currents of $ICM_L$ and $ICM_H$; in the U.S. Pat. No. 7,567,105, the common-mode input voltage range of the front-end amplifier is between (VCC−1.8)V and (−0.8) V; in the U.S. Pat. No. 7,738,566, the common-mode input voltage range of the front-end amplifier is between (VCC−1.1875)V and (−∞)V. Therefore, all the abovementioned conventional technologies respectively have their own limitations. Besides, in the U.S. Pat. No. 7,738,566 and U.S. Pat. No. 7,567,105, the common-mode voltage level of the CAN bus during recessive state is determined by the voltage divisions of the power supply voltage, and the voltage division is undertaken by the resistor assembly electrically connected with the power supply end, the ground end, the CAN high end and the CAN low end. However, the resistance values of the resistors are likely to deviate from the designed values in practical fabrication of chips. Thus, the common-mode voltage level of the CAN bus during the recessive state is likely to deviate from the common-mode voltage level output by the transmitter of the CAN transceiver integration circuit during the dominant state. Then, the common-mode signals of the CAN bus are likely to have high-frequency fluctuation, which causes EME to be increased during transceiver circuit operation.

Accordingly, the present invention proposes a receiving circuit with an ultra-wide common-mode input voltage range, which can be applied as the receiving circuit of a CAN transceiver integration circuit, to overcome the problems of the conventional technologies.

SUMMARY OF THE INVENTION

The primary objective of the present invention is to provide a receiving circuit with an ultra-wide common-mode input voltage range, which is applicable to a transceiver integration circuit of a controller area network (CAN). While input voltage signals enter the receiving circuit of the present invention, the receiving circuit can receive differential signals of a common-mode range between the positive infinite volt (+∞ V) and the negative infinite volt (−∞ V). The receiving circuit of the present invention can also decrease electromagnetic emission while the practical values of the elements deviate from the ideal values.

To achieve the abovementioned objective, the present invention proposes a receiving circuit with an ultra-wide common-mode input voltage range, which is electrically connected with the output end of the receiving circuit, and which comprises a resistor assembly, a reference amplifier, a first input amplifier assembly, a second input amplifier assembly, and an analog adder. The resistor assembly is electrically connected with a CAN high end (CANH) and a CAN low end (CANL). The resistor assembly includes a first resistor, a second resistor, a third resistor and a fourth resistor, which are cascaded with the CANH and the CANL in sequence. A first node is arranged between the first resistor and the second resistor. A second node is arranged between the third resistor and the fourth resistor. The first resistor is electrically connected with the CANH and the first node. The fourth resistor is electrically connected with the CANL and the second node. The resistor assembly receives the CANH voltage (VCANH) and the CANL voltage (VCANL). The resistor assembly bucks the voltage and generates a CANH voltage division ($VCANH_{DIV}$) and a CANL voltage division ($VCANL_{DIV}$) respectively at the first node and the second node. The reference amplifier has a reference amplifier input end and a reference amplifier output end. The reference amplifier input end is electrically connected with a reference voltage source. The reference amplifier output end is electrically connected with a contact between the second resistor and the third resistor. The first input amplifier assembly has a first input amplifier assembly output end. The first input amplifier assembly is electrically connected with a power source end, the first node and the second node. The second input amplifier assembly has a second input amplifier assembly output end. The second input amplifier assembly is electrically connected with a ground terminal, the first node and the second node. Each of the first input amplifier assembly and the second input amplifier assembly receives the $VCANH_{DIV}$ from the first node and the $VCANL_{DIV}$ from the second node. The first input amplifier assembly outputs a first single-end output signal from the first input amplifier assembly output end. The second input amplifier assembly outputs a second single-end output signal from the second input amplifier assembly output end. The analog adder has an analog adder input end and an analog adder output end. The analog adder input end is electrically connected with the first input amplifier assembly output end and the second input amplifier assembly output end. The analog adder output end is electrically connected with the output end of the receiving circuit. The analog adder receives and adds the first single-end output signal and the second single-end output signal and then outputs the resultant signal to the output end of the receiving circuit. Each of the first input amplifier assembly and the second input amplifier assembly can independently amplify the differential signal of the first node and the second node and convert the amplified signal into a single-end signal. The analog adder adds single-end signals output by the first input amplifier assembly and the second input amplifier assembly and obtains a received signal.

Below, embodiments are described in detail in cooperation with the attached drawings to make easily understood the objectives, technical contents, characteristics and accomplishments of the present invention.

DETAILED DESCRIPTION OF THE INVENTION

The controller area network (CAN) is one of the field buses widely used internationally, featuring high bit rate, high anti-interference ability, and error detection capability. The controller area network has been extensively applied to the automobile industry and aircraft industry. The receiving circuit with an ultra-wide common-mode input voltage range of the present invention can receive a wider common-mode input voltage range than the conventional receiving circuits. In the case that the circuit parameters deviate from the designed values in practical fabrication, the receiving circuit of the present invention can still maintain the electromagnetic emission at a very low level.

Figure 1:
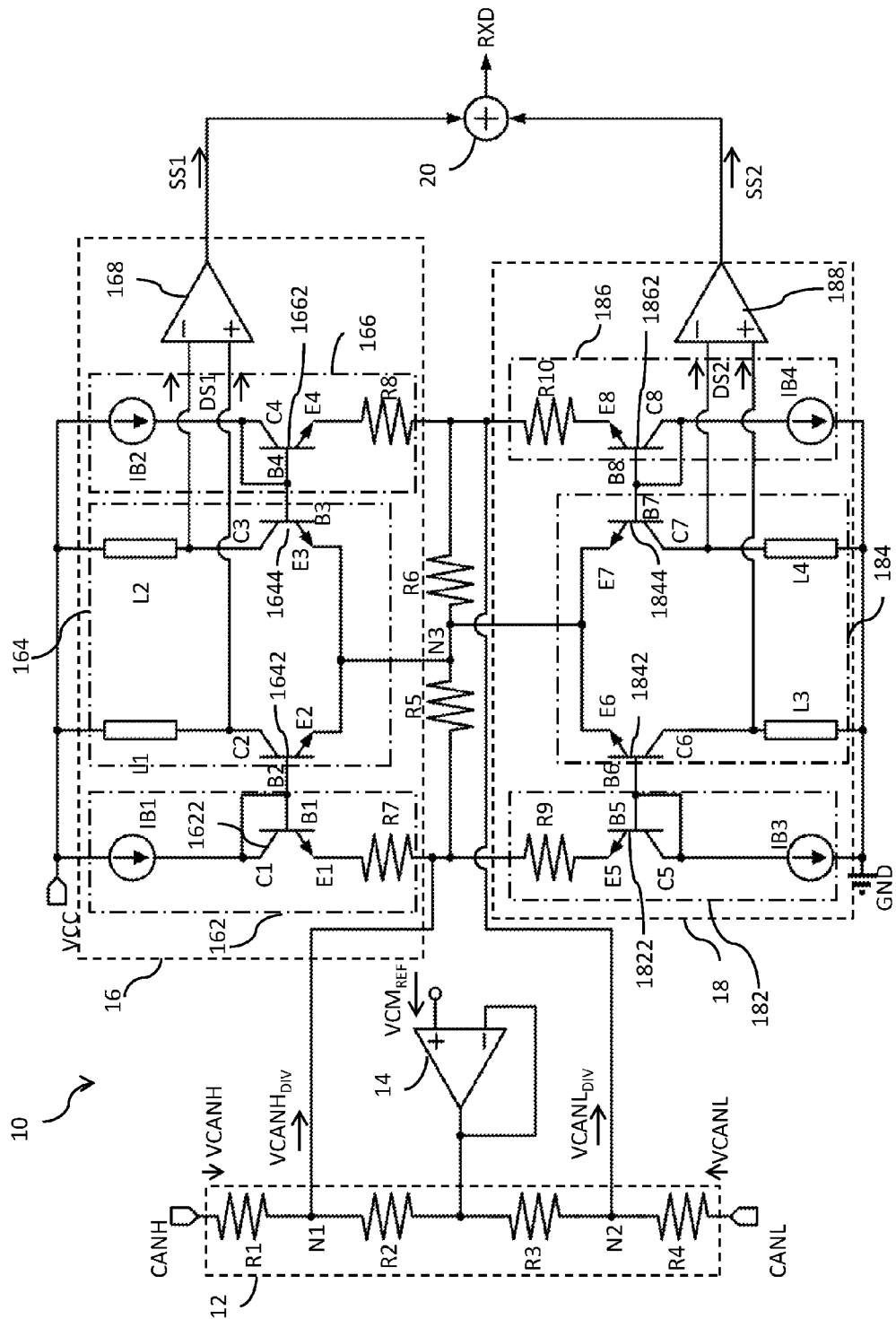
FIG. 1 is a diagram schematically showing the architecture of a receiving circuit according to one embodiment of the present invention.

Refer to FIG. 1 a diagram schematically showing the architecture of a receiving circuit according to one embodiment of the present invention. The present invention proposes a receiving circuit 10 with an ultra-wide common-mode input voltage range. The receiving circuit 10 is electrically connected with an output end RXD of the receiving circuit of a controller area network (CAN) and applicable to a transceiver integration circuit of a controller area network. The receiving circuit 10 with an ultra-wide common-mode input voltage range comprises a resistor assembly 12, a reference amplifier 14, a first input amplifier assembly 16, a second input amplifier assembly 18, and an analog adder 20. The resistor assembly 12 is electrically connected with a CAN high end CANH and a CAN low end CANL. The main function of the receiving circuit 10 is amplifying the differential signals of the CAN high end CANH and the CAN low end CANL and converting to single-end digital signals on output end RXD which voltage level is switched between power and ground. The resistor assembly 12 includes a first resistor R1, a second resistor R2, a third resistor R3, and a fourth resistor R4, which are cascaded in sequence. A first node N1 is arranged between the first resistor R1 and the second resistor R2. A second node N2 is arranged between the third resistor R3 and the fourth resistor R4. The first resistor R1 is electrically connected with the CAN high end CANH. The fourth resistor R4 is electrically connected with the CAN low end CANL.

The resistor assembly 12 receives a high end voltage VCANH from the CAN high end CANH and a low end voltage VCANL from the CAN low end CANL. The resistor assembly 12 bucks the voltage and generates a high end voltage division $VCANH_{DIV}$ and a low end voltage division $VCANL_{DIV}$ respectively at the first node N1 and the second node N2. The resistor assembly 12 functions to provide a high impedance (normally about 30K ohms) between the high end CANH and the low end CANL during the recessive state and slightly attenuate the common-mode voltage of the high end CANH and the low end CANL lest too high an input voltage burn down internal transistors. The reference amplifier 14 has a reference amplifier input end and a reference amplifier output end. The reference amplifier input end is electrically connected with a reference voltage source $VCM_{REF}$. The reference amplifier output end is electrically connected with a contact between the second resistor R2 and the third resistor R3. The reference amplifier 14 is an inverting closed-loop amplifier, functioning to bias the common-mode voltage of the CAN bus to the reference voltage source $VCM_{REF}$ during the recessive state. The first input amplifier assembly 16 has a first input amplifier assembly output end. The first input amplifier assembly 16 is electrically connected with a power source end VCC, the first node N1 and the second node N2. The second input amplifier assembly 18 has a second input amplifier assembly output end. The second input amplifier assembly 18 is electrically connected with a ground terminal GND, the first node N1 and the second node N2. Each of the first input amplifier assembly 16 and the second input amplifier assembly 18 can independently amplify the differential signal of the first node N1 and the second node N2 ($VCANH_{DIV}$–$VCANL_{DIV}$) and convert the amplified signal into a single-end signal. The analog adder 20 has an analog adder input end and an analog adder output end. The analog adder input end is electrically connected with the first input amplifier assembly output end and the second input amplifier assembly output end. The analog adder output end is electrically connected with the output end RXD of the receiving circuit 10. The analog adder 20 receives and adds the single-end output signals of the first input amplifier assembly 16 and the second input amplifier assembly 18, and then the output end RXD of the receiving circuit 10 outputs the resultant signal as the received signal.

In this paragraph, the first input amplifier assembly 16, the second input amplifier assembly 18 and other elements of the receiving circuit 10 of the present invention will be further described in detail. The first input amplifier assembly 16 includes a first voltage level shifter 162, a first differential amplifier 164, a second voltage level shifter 166, and a first output amplifier 168. The first voltage level shifter 162 is electrically connected with the power source end VCC and the first node N1. The first voltage level shifter 162 can upshift the DC voltage level of the high end voltage division $VCANH_{DIV}$ to the voltage range handleable by the first differential amplifier 164. The second voltage level shifter 166 is electrically connected with the power source end VCC and the second node N2. The second voltage level shifter 166 can upshift the DC voltage level of the low end voltage division $VCANL_{DIV}$ to the voltage range handleable by the first differential amplifier 164. The first differential amplifier 164 is electrically connected with the power source end VCC, the first voltage level shifter 162, and the second voltage level shifter 166. The first differential amplifier 164 receives a differential signal, which the direct-current voltage level is adjusted by the first voltage level shifter 162 and the second voltage level shifter 166 from the first node N1 and the second node N2, to generate a first differential signal DS1. A first load L1 and a second load L2 are arranged between the output end of the first differential amplifier 164 and the power source end VCC. Each of the first load L1 and the second load L2 is electrically connected with the power source end VCC, the output end of the first differential amplifier 164, and the input end of the first output amplifier 168. The input end of the first output amplifier 168 is electrically connected with the output end of the first differential amplifier 164. The output end of the first output amplifier 168 is electrically connected with a first input end of the analog adder 20. The first output amplifier 168 receives the first differential signal DS1 output by the first differential amplifier 164, amplifying the first differential signal DS1, converting the first differential signal DS1 into a first single-end output signal SS1, and outputting the first single-end output signal SS1 to the analog adder 20. The second input amplifier assembly 18 includes a third voltage level shifter 182, a second differential amplifier 184, a fourth voltage level shifter 186, and a second output amplifier 188. The third voltage level shifter 182 is electrically connected with the ground terminal GND and the first node N1. The third voltage level shifter 182 can downshift the DC voltage level of the high end voltage division $VCANH_{DIV}$ to the voltage range handleable by the second differential amplifier 184. The fourth voltage level shifter 186 is electrically connected with the ground terminal GND and the second node N2. The fourth voltage level shifter 186 can downshift the DC voltage level of the low end voltage division $VCANL_{DIV}$ to the voltage range handleable by the second differential amplifier 184. The second differential amplifier 184 is electrically connected with the third voltage level shifter 182, the fourth voltage level shifter 186, and the ground terminal GND. The second differential amplifier 184 receives a differential signal, which direct-current voltage level is adjusted by the third voltage level shifter 182 and the fourth voltage level shifter 186 from the first node N1 and the second node N2, to generate a second differential signal DS2. A third load L3 and a fourth load L4 are arranged between the output end of the second differential amplifier 184 and the ground terminal GND. Each of the third load L3 and the fourth load L4 is electrically connected with the output end of the second differential amplifier 184, the ground terminal GND, and the input end of the second output amplifier 188. The second output amplifier 188 is electrically connected with the second differential amplifier 184 and a second input end of the analog adder 20, receiving the second differential signal DS2 from the second differential amplifier 184, amplifying the second differential signal DS2, converting the second differential signal DS2 into a second single-end output signal SS2, and outputting the second single-end output signal SS2 to the analog adder 20. The analog adder 20 adds the first single-end output signal SS1 of the first output amplifier 168 and the second single-end output signal SS2 of the second output amplifier 188 and then outputs the resultant signal as the output voltage of the receiving circuit. The user can control the stability of current, using a first constant current source IB1, a second constant current source IB2, a third constant current source IB3, and a fourth constant current source IB4. Each of the first load L1, the second load L2, the third load L3 and the fourth load L4 is a resistive load, an inductive load or a transistor load. In the receiving circuit 10 with an ultra-wide common-mode input voltage range, a fifth resistor R5 and a sixth resistor R6 are cascaded between the first node N1 and the second node N2, and a third node N3 is formed between the fifth resistor R5 and the sixth resistor R6. The third node N3 is electrically connected with the fifth resistor R5, the sixth resistor R6, the first differential amplifier 164 and the second differential amplifier 184. The resistance of the fifth resistor R5 is equal to the resistance of the sixth resistor R6. The fifth resistor R5 and the sixth resistor R6 can bias the emitters of the first differential amplifier 164 and the second differential amplifier 184 with a common-mode voltage of the high end voltage division $VCANH_{DIV}$ and the low end voltage division $VCANL_{DIV}$ ($0.5*VCANH_{DIV}+0.5*VCANL_{DIV}$).

Refer to FIG. 1 again. The first voltage level shifter 162, the second voltage level shifter 166, the first differential amplifier 164, the third voltage level shifter 182, the fourth voltage level shifter 186 and the second differential amplifier 184 will be described in further detail below. The first voltage level shifter 162 includes a seventh resistor R7 and a first transistor 1622. The seventh resistor R7 is electrically connected with the first node N1 and the first transistor 1662. A first emitter E1 of the first transistor 1622 is electrically connected with the seventh resistor R7. A first collector C1 of the first transistor 1622 is electrically connected with the first constant current source IB1, a first base B1 of the first transistor 1622 and the first differential amplifier 164. The first base B1 is electrically connected with the first constant current source IB1, the first collector C1, and the first differential amplifier 164. The first constant current source IB1 is electrically connected with the power source end VCC, the first collector C1, and the first base B1. The first voltage level shifter 162 can upshift the DC voltage level of the high end voltage division $VCANH_{DIV}$ by $V_{BE1}+IB1*R7$ to a voltage range handleable by a second base B2 of the first differential amplifier 164. The second voltage level shifter 166 includes an eighth resistor R8 and a fourth transistor 1662. The eighth resistor R8 is electrically connected with the second node N2 and the fourth transistor 1662. A fourth emitter E4 of the fourth transistor 1662 is electrically connected with the eighth resistor R8. A fourth collector C4 of the fourth transistor 1662 is electrically connected with the second constant current source IB2, a fourth base B4 of the fourth transistor 1662, and the first differential amplifier 164. The fourth base B4 of the fourth transistor 1662 is electrically connected with the second current source IB2, the fourth collector C4, and the first differential amplifier 164. The second constant current source IB2 is electrically connected with the power source end VCC, the fourth collector C4, and the fourth base B4. The second voltage level shifter 166 can upshift the DC voltage level of the low end voltage division $VCANL_{DIV}$ by $V_{BE4}+IB2*R8$ to a voltage range handleable by a third base B3 of the first differential amplifier 164. The first differential amplifier 164 includes a second transistor 1642 and a third transistor 1644. A second base B2 of the second transistor 1642 is electrically connected with the first collector C1 and the first base B1 of the first transistor 1622. A second emitter E2 of the second transistor 1642 is electrically connected with the third node N3. A second collector C2 of the second transistor 1642 is electrically connected with a contact between the first load L1 and the first output amplifier 168. A third base B3 of the third transistor 1644 is electrically connected with the fourth collector C4 and the fourth base B4 of the fourth transistor 1662. A third emitter E3 of the third transistor 1644 is electrically connected with the third node N3. A third collector C3 of the third transistor 1644 is electrically connected with a contact between the second load L2 and the first output amplifier 168. The third voltage level shifter 182 includes a ninth resistor R9 and a fifth transistor 1822. The ninth resistor R9 is electrically connected with the first node N1 and the fifth transistor 1822. A fifth emitter E5 of the fifth transistor 1822 is electrically connected with the ninth resistor R9. A fifth collector C5 of the fifth transistor 1822 is electrically connected with the third constant current source IB3, a fifth base B5 of the fifth transistor 1822, and the second differential amplifier 184. The fifth base B5 of the fifth transistor 1822 is electrically connected with the third constant current source IB3, the fifth collector C5 of the fifth transistor 1822, and the second differential amplifier 184. The third constant current source IB3 is electrically connected with the ground terminal GND, the fifth collector C5 and the fifth base B5. The third voltage level shifter 182 can downshift the DC voltage level of the high end voltage division $VCANH_{DIV}$ by $V_{BE5}+IB3*R9$ to a voltage range handleable by a sixth base B6 of the second differential amplifier 184. The fourth voltage level shifter 186 includes a tenth resistor R10 and an eighth transistor 1862. The tenth resistor R10 is electrically connected with the second node N2 and the eighth transistor 1862. An eighth emitter E8 of the eighth transistor 1862 is electrically connected with the tenth resistor R10. An eighth collector C8 of the eighth transistor 1862 is electrically connected with the fourth constant current source IB4, an eighth base B8 of the eighth transistor 1862, and the second differential amplifier 184. The eighth base B8 of the eighth transistor 1852 is electrically connected with the fourth constant current source IB4, the eighth collector C8, and the second differential amplifier 184. The fourth constant current source IB4 is electrically connected with the ground terminal GND, the eighth collector C8, and the eighth base B8. The fourth voltage level shifter 186 can downshift the DC voltage level of the low end voltage division $VCANL_{DIV}$ by $V_{BE6}+IB4*R10$ to a voltage range handleable by a seventh base B7 of the second differential amplifier 184. The second differential amplifier 184 includes a sixth transistor 1842 and a seventh transistor 1844. A sixth base B6 of the sixth transistor 1842 is electrically connected with the fifth collector C5 and the fifth base B5 of the fifth transistor 1822. A sixth emitter E6 of the sixth transistor 1842 is electrically connected with the third node N3. A sixth collector C6 of the sixth transistor 1842 is electrically connected with a contact between the third load L3 and the second output amplifier 188. A seventh base B7 of the seventh transistor 1844 is electrically connected with the fourth voltage level shifter 186. A seventh emitter E7 of the seventh transistor 1844 is electrically connected with the third node N3. A seventh collector C7 of the seventh transistor 1844 is electrically connected with a contact between the fourth load L4 and the second output amplifier 188.

Figure 2:
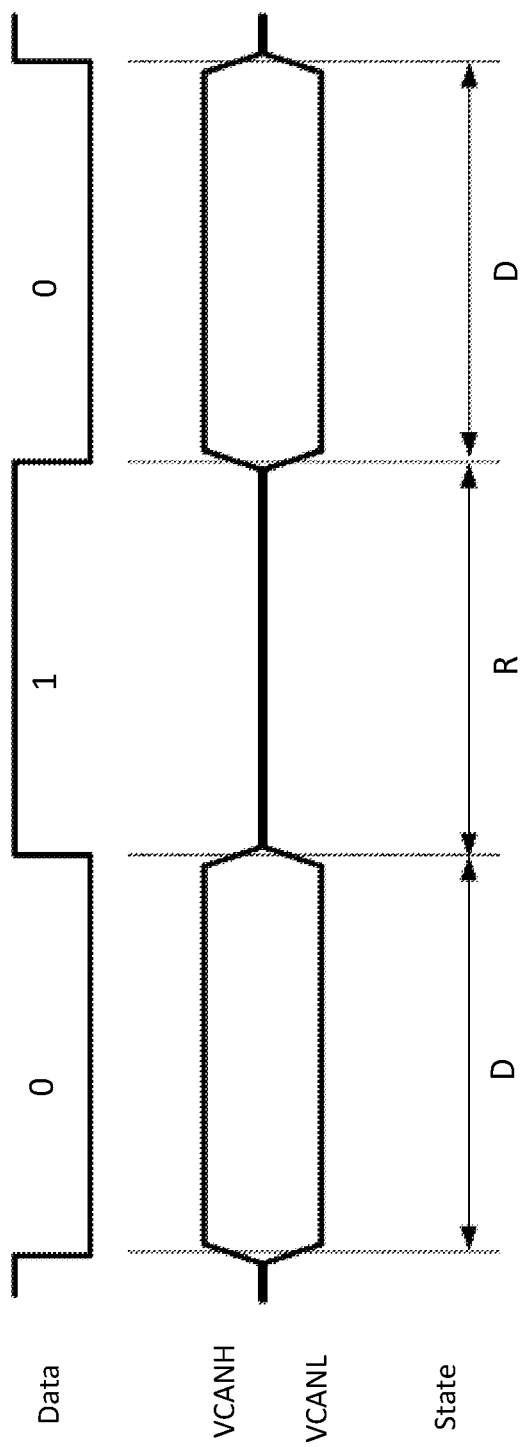
FIG. 2 is a diagram schematically showing a dominant state and a recessive state according to one embodiment of the present invention.
Figure 3:
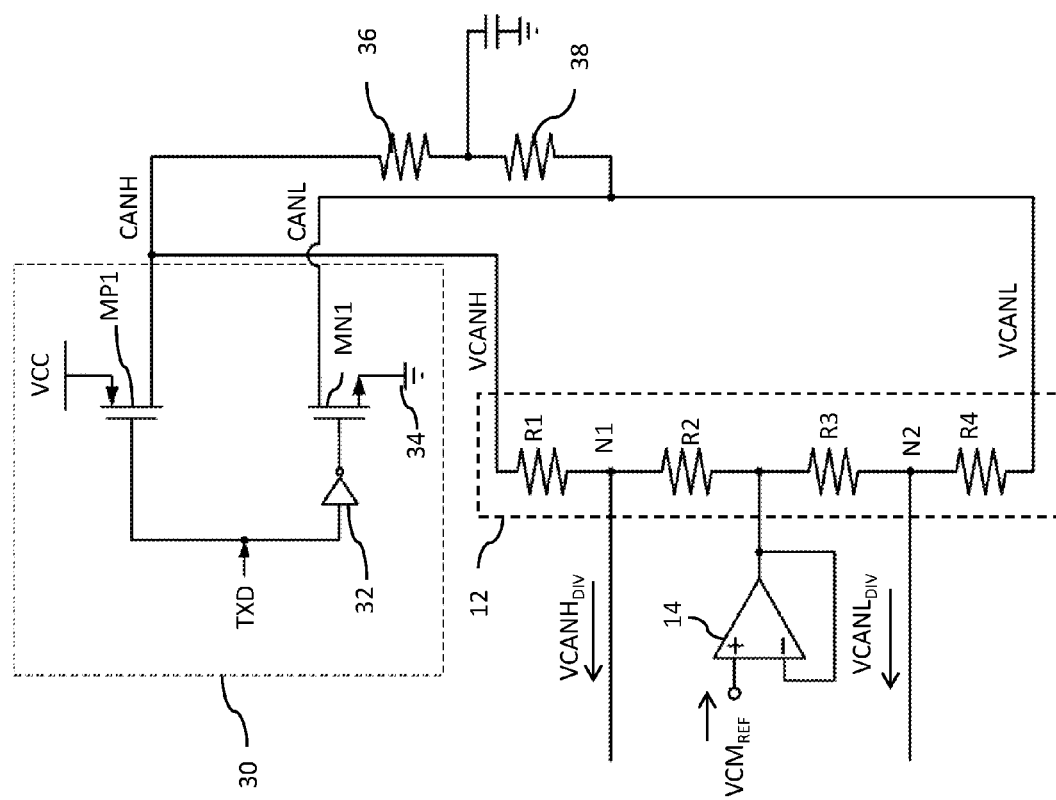
FIG. 3 is a diagram schematically showing the circuit where a resistor assembly is electrically connected with a transmitter according to one embodiment of the present invention.

Refer to FIG. 1 and FIG. 2. The controller area network (CAN) has two states: a recessive state R while transmitting data of 1 and a dominant state D while transmitting data of 0. During the dominant state D, the transmitter generates the high end voltage VCANH and the low end voltage VCANL to the high end CANH and the low end CANL of the CAN bus. During the recessive state R, the transmitter turns off, and the reference amplifier 14 transmits a reference voltage $VCM_{REF}$ to the resistor assembly 12. The resistor assembly 12 further transmits the reference voltage $VCM_{REF}$ to the high end CANH and the low end CANL of the CAN bus to determine the high end voltage VCANH and the low end voltage VCANL. In the resistor assembly 12, the resistance of the first resistor R1 is equal to the resistance of the fourth resistor R4; the resistance of the second resistor R2 is equal to the resistance of the third resistor R3; the resistance of the first resistor R1 plus the second resistor R2 is designed to be about 15K ohms, and the resistance of the third resistor R3 plus the fourth resistor R4 is also about 15K ohms. Refer to FIG. 3 also. The CAN transceiver integration circuit further comprises a transmitter 30. The transmitter 30 is electrically connected with the high end CANH and the low end CANL of the CAN bus. The receiving circuit 10 with an ultra-wide common-mode input voltage range of the present invention is electrically connected with the transmitter 30 through the high end CANH and the low end CANL of the CAN bus. The transmitter 30 is a standard transmitter applied to CAN bus. The transmitter 30 includes a power source end VCC, a first field effect transistor MP1, a transmitter input end TXD, a second field effect transistor MN1, a phase inverter 32, and a ground terminal 34. A resistor 36 and a resistor 38, each of which has a resistance of 30 ohms, are applied the transmitter 30 output to generate the voltage of the high end CANH and the low end CANL. While the voltage of the transmitter input end TXD is zero, it is during the dominant state D, and the first field effect transistor MP1 and the second field effect transistor MN1 turn on. The first field effect transistor MP1, the second field effect transistor MN1, the 30-ohm resistor 36, and the 30-ohm resistor 38 are cascaded between the power source end VCC and the ground terminal GND to perform voltage division and generate the high end voltage VCANH and the low end voltage VCANL of the CAN bus. In the dominant state D, the high end voltage VCANH, the low end voltage VCANL, and the common-mode voltage of the high end CANH and the low end CANL of the CAN bus are respectively expressed by Equations (1)-(3):

$$VCANH=VCC*(RONMN1+60)/(RONMP1+RONMN1+60) \quad (1)$$

$$VCANL=VCC*(RONMN1)/(RONMP1+RONMN1+60) \quad (2)$$

The common-mode voltage during the dominant state D $$=(VCANH+VCANL)/2$$

$$=VCC*(RONMN1+30)/(RONMP1+RONMN1+60) \quad (3)$$

wherein RONMP1 is the turn-on resistance of the first field effect transistor MP1, RONMN1 is the turn-on resistance of the second field effect transistor MN1, and 60 is the sum of the resistances of the resistor 36 and the resistor 38.

While the voltage of the transmitter input end TXD is equal to VCC, it is during the recessive state R. During the recessive state R, the first field effect transistor MP1 and the second field effect transistor MN1 turn off; both the high end voltage VCANH of the high end CANH and the low end voltage VCANL of the low end CANL are equal to the reference voltage $VCM_{REF}$ which is transmitted to the resistor assembly 12 by the reference amplifier 14. In the recessive state R, the common-mode voltage of the high end CANH and the low end CANL of the CAN bus is expressed by Equation (4):

The common-mode voltage in the recessive state R $$=0.5*(VCANH+VCANL)=VCM \quad (4)$$

wherein the reference voltage $VCM_{REF}$ is the voltage input to the reference amplifier 14. Based on Equations (3) and (4), an external reference voltage generation circuit could be applied to the present invention to generate a reference voltage $VCM_{REF}$, which is equal to the common-mode voltage shown in Equation (3) that the transmitter 30 transmits to the high end CANH and the low end CANL in the dominant state D, to the input of reference amplifier 14. Thus, during the dominant state D and the recessive state R, the common-mode voltage keeps a fixed value. Then, the frequency spectrum of the common mode voltage on the CAN bus could be free of high-frequency spurious tones and noise, and the electromagnetic emission could be effectively reduced.

Refer to FIG. 1 again. While the common-mode input voltage of the high end voltage division $VCANH_{DIV}$ and the low end voltage division $VCANL_{DIV}$ is higher than the highest common-mode input voltage handleable by the first output amplifier 168 minus the collector-emitter voltage drops of the second transistor 1642 and the third transistor 1644 (VCE2 and VCE3), the first output amplifier 168 does not operate but generates a first single-end output signal SS1 of 0. In such a case, the second differential amplifier 184 and the second output amplifier 188 amplify the high end voltage division $VCANH_{DIV}$ and the low end voltage division $VCANL_{DIV}$ and convert them into the second single-end output signal SS2; the analog adder 20 then outputs the second single-end output signal SS2 to the receiving circuit output end RXD. At this moment, the voltage output by the receiving circuit output end RXD is equal to the second single-end output signal SS2. While the common-mode input voltage of the high end voltage division $VCANH_{DIV}$ and the low end voltage division $VCANL_{DIV}$ is lower than the lowest common-mode input voltage handleable by the second output amplifier 188 plus the collector-emitter voltage drops of the sixth transistor 1842 and the seventh transistor 1844 (VCE6 and VCE7), the second output amplifier 188 does not operate but generates a second single-end output signal SS2 of 0. In such a case, the first differential amplifier 164 and the first output amplifier 168 amplify the high end voltage division $VCANH_{DIV}$ and the low end voltage division $VCANL_{DIV}$ and convert them into the first single-end output signal SS1; the analog adder 20 then outputs the first single-end output signal SS1 to the receiving circuit output end RXD. At this moment, the voltage output by the receiving circuit output end RXD is equal to the first single-end output signal SS1. While the common-mode input voltage of the high end voltage division $VCANH_{DIV}$ and the low end voltage division $VCANL_{DIV}$ is between the highest common-mode input voltage handleable by the first output amplifier 168 minus the collector-emitter voltage drops of the second transistor 1642 and the third transistor 1644 (VCE2 and VCE3) and the lowest common-mode input voltage handleable by the second output amplifier 188 plus the collector-emitter voltage drops of the sixth transistor 1842 and the seventh transistor 1844 (VCE6 and VCE7), the first differential amplifier 164 and the first output amplifier 168 amplify the high end voltage division $VCANH_{DIV}$ and the low end voltage division $VCANL_{DIV}$ and convert them into the first single-end output signal SS1, and the second differential amplifier 184 and the second output amplifier 188 amplify the high end voltage division $VCANH_{DIV}$ and the low end voltage division $VCANL_{DIV}$ and convert them into the second single-end output signal SS2. Then, the analog adder 20 outputs the first single-end output signal SS1 and the second single-end output signal SS2 to the receiving circuit output end RXD. At this moment, the voltage output by the receiving circuit output end RXD is generated by the first single-end output signal SS1 plus the second single-end output signal SS2.

Therefore, no matter what the value of the common-mode voltage of the high end voltage division $VCANH_{DIV}$ and the low end voltage division $VCANL_{DIV}$ is, the receiving circuit with an ultra-wide common-mode input voltage range of the present invention will transmit the signal received from the high end CANH and the low end CANL of the CAN bus to the receiving circuit output RXD. Further, the present invention uses the reference amplifier to control the common-mode voltage of the network in the recessive state to be equal to the common-mode voltage of the network in the dominant state. Thereby, the electromagnetic emission is reduced.

The embodiments mentioned above are to demonstrate the technical thought and characteristics of the present invention to enable the persons skilled in the art to understand, make, and use the present invention. However, these embodiments are not intended to limit the scope of the present invention. Any equivalent modification or variation according to the spirit of the present invention is to be also included within the scope of the present invention.

What is claimed is:

1. A receiving circuit with an ultra-wide common-mode input voltage range, which is electrically connected with an output end of a receiving circuit of a controller area network (CAN) and applicable to a transceiver integration circuit of said controller area network, comprising:
    a resistor assembly electrically connected with a high end and a low end of said controller area network (CANH and CANL) and including a first resistor, a second resistor, a third resistor and a fourth resistor, wherein a first node is arranged between said first resistor and said second resistor, and a second node is arranged between said third resistor and said fourth resistor, and wherein said first resistor is electrically connected with said high end and said first node, and said fourth resistor is electrically connected with said low end and said second node, and wherein said resistor assembly receives a high end voltage (VCANH) from said high end and a low end voltage (VCANL) from said low end and bucks voltage to generate and output a high end voltage division (VCANH$_{DIV}$) at said first node and a low end voltage division (VCANL$_{DIV}$) at said second node;
    a reference amplifier having a reference amplifier input end and a reference amplifier output end, wherein said reference amplifier input end is electrically connected with a reference voltage source, and said reference amplifier output end is electrically connected with a contact between said second resistor and said third resistor;
    a first input amplifier assembly and a second input amplifier assembly, wherein said first input amplifier assembly has a first input amplifier assembly output end, and said second input amplifier assembly has a second input amplifier output end, and wherein said first input amplifier assembly is electrically connected with a power source end, said first node and said second node, and wherein said second input amplifier assembly is electrically connected with a ground terminal, said first node and said second node, and wherein each of said first input amplifier assembly and said second input amplifier assembly receives said high end voltage division (VCANH$_{DIV}$) from said first node and receives said low end voltage division (VCANL$_{DIV}$) from said second node, and wherein said first input amplifier assembly outputs a first single-end output signal from said first input amplifier assembly output end, and wherein said second input amplifier assembly outputs a second single-end output signal from said second input amplifier assembly output end; and
    an analog adder having an analog adder input end and an analog adder output end, wherein said analog adder input end is electrically connected with said first input amplifier assembly output end and said second input amplifier assembly output end, and wherein said analog adder output end is electrically connected with said output end of said receiving circuit, and wherein said analog adder receives said first single-end output signal and said second single-end output signal, adds said first single-end output signal and said second single-end output signal to generate a resultant signal, and outputs said resultant signal to said output end of said receiving circuit.

2. The receiving circuit with an ultra-wide common-mode input voltage range according to claim 1, wherein said reference amplifier transmits a reference voltage generated by said reference voltage source to said resistor assembly.

3. The receiving circuit with an ultra-wide common-mode input voltage range according to claim 2, wherein said transceiver integration circuit of said controller area network includes a transmitter, and wherein said transmitter is electrically connected with said high end and said low end and transmits a differential signal to said high end and said low end in a dominant state, and wherein a common-mode voltage of said differential signal is supplied to said reference voltage source as said reference voltage.

4. The receiving circuit with an ultra-wide common-mode input voltage range according to claim 1, wherein said reference amplifier is an inverting closed-loop amplifier.

5. The receiving circuit with an ultra-wide common-mode input voltage range according to claim 1, wherein said first input amplifier assembly includes:
    a first voltage level shifter electrically connected with said power source end and said first node for adjusting a direct-current voltage level of said first node;
    a second voltage level shifter electrically connected with said power source end and said second node for adjusting a direct-current voltage level of said second node;
    a first differential amplifier electrically connected with said power source end, said first voltage level shifter and said second voltage level shifter, receiving a differential signal, which a direct-current voltage level is adjusted by said first voltage level shifter and said second voltage level shifter from said first node and said second node, to generate a first differential signal; and
    a first output amplifier electrically connected said first differential amplifier, receiving said first differential signal from said first differential amplifier, amplifying said first differential signal, converting said first differential signal into a first single-end output signal, and transmitting said first single-end output signal to said analog adder.

6. The receiving circuit with an ultra-wide common-mode input voltage range according to claim 5, wherein said second input amplifier assembly includes:
    a third voltage level shifter electrically connected with said ground terminal and said first node for adjusting a direct-current voltage level of said first node;
    a fourth voltage level shifter electrically connected with said ground terminal and said second node for adjusting a direct-current voltage level of said second node;
    a second differential amplifier electrically connected with said ground terminal, said third voltage level shifter and said fourth voltage level shifter, receiving a differential signal, which a direct-current voltage level is adjusted by said third voltage level shifter and said fourth voltage level shifter from said first node and said second node, to generate a second differential signal; and a second output amplifier electrically connected with said second differential amplifier, receiving said second differential signal from said second differential amplifier, amplifying said second differential signal, converting said second differential signal into a second single-end output signal, and transmitting said second single-end output signal to said analog adder.

7. The receiving circuit with an ultra-wide common-mode input voltage range according to claim 6 further comprising a fifth resistor and a sixth resistor cascaded between said first node and said second node and having a third node therebetween, wherein said third node is electrically connected with said fifth resistor, said sixth resistor, said first differential amplifier and said second differential amplifier, and wherein a resistance of said fifth resistor is equal to a resistance of said sixth resistor, and wherein a voltage of said third node is equal to a half of a sum of said high end voltage division ($VCANH_{DIV}$) from said first node and said low end voltage division ($VCANL_{DIV}$) from said second node.

8. The receiving circuit with an ultra-wide common-mode input voltage range according to claim 7, wherein a first load and a second load are arranged between said first differential amplifier and said power source end, and wherein each of said first load and said second load is a resistive load, a inductive load or a transistor load.

9. The receiving circuit with an ultra-wide common-mode input voltage range according to claim 8, wherein a third load and a fourth load are arranged between said second differential amplifier and said ground terminal, and wherein each of said third load and said fourth load is a resistive load, a inductive load or a transistor load.

10. The receiving circuit with an ultra-wide common-mode input voltage range according to claim 9, wherein said first voltage level shifter includes:
  a seventh resistor electrically connected with said first node; and
  a first transistor having a first base, a first collector and a first emitter, wherein said first emitter is electrically connected with said seventh resistor, and wherein said first collector is electrically connected with said first base, a first constant current source, and said first differential amplifier, and wherein said first base is electrically connected with said first collector, said first constant current source, and said first differential amplifier.

11. The receiving circuit with an ultra-wide common-mode input voltage range according to claim 10, wherein said second voltage level shifter includes:
  an eighth resistor electrically connected with said second node; and
  a fourth transistor having a fourth base, a fourth collector and a fourth emitter, wherein said fourth emitter is electrically connected with said eighth resistor, and wherein said fourth collector is electrically connected with said fourth base, a second constant current source, and said first differential amplifier, and wherein said fourth base is electrically connected with fourth collector, said second constant current source, and said first differential amplifier.

12. The receiving circuit with an ultra-wide common-mode input voltage range according to claim 11, wherein said first differential amplifier includes:

a second transistor having a second base, a second collector and a second emitter, wherein said second base is electrically connected with said first voltage level shifter, and wherein said second emitter is electrically connected with said third node, and wherein said second collector is electrically connected with said first load and said first output amplifier; and
  a third transistor having a third base, a third collector and a third emitter, wherein said third base is electrically connected with said second voltage level shifter, and wherein said third emitter is electrically connected with said third node, and wherein said third collector is electrically connected with said second load and said first output amplifier.

13. The receiving circuit with an ultra-wide common-mode input voltage range according to claim 12, wherein said third voltage level shifter includes:
  a ninth resistor electrically connected with said first node; and
  a fifth transistor having a fifth base, a fifth collector and a fifth emitter, wherein said fifth emitter is electrically connected with said ninth resistor, and wherein said fifth collector is electrically connected with said fifth base, a third constant current source and said second differential amplifier, and wherein said fifth base is electrically connected with said fifth collector, said third constant current source and said second differential amplifier.

14. The receiving circuit with an ultra-wide common-mode input voltage range according to claim 13, wherein said fourth voltage level shifter includes:
  a tenth resistor electrically connected with said second node; and
  an eighth transistor having an eighth base, an eighth collector and an eighth emitter, wherein said eighth emitter is electrically connected with said tenth resistor, and wherein said eighth collector is electrically connected with said eighth base, a fourth constant current source, and said second differential amplifier, and wherein said eighth base is electrically connected with said eighth collector, said fourth constant current source and said second differential amplifier.

15. The receiving circuit with an ultra-wide common-mode input voltage range according to claim 14, wherein said second differential amplifier includes:
  a sixth transistor having a sixth base, a sixth collector and a sixth emitter, wherein said sixth base is electrically connected with said third voltage level shifter, and wherein said sixth emitter is electrically connected with said third node, and wherein said sixth collector is electrically connected with said third load and said second output amplifier; and
  a seventh transistor having a seventh base, a seventh collector and a seventh emitter, wherein said seventh base is electrically connected with said fourth voltage level shifter, and wherein said seventh emitter is electrically connected with said third node, and wherein said seventh collector is electrically connected with said fourth load and said second output amplifier.

* * * * *